United States Patent
Ames

(10) Patent No.: US 6,470,495 B1
(45) Date of Patent: Oct. 22, 2002

(54) SATELLITE CONTROL OF ELECTRONIC MEMORY DEVICES

(75) Inventor: Stephen J. Ames, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 725 days.

(21) Appl. No.: 08/709,021

(22) Filed: Sep. 6, 1996

(51) Int. Cl.[7] ................................................. G06F 9/44
(52) U.S. Cl. ....................................... 717/173; 709/220
(58) Field of Search ............................. 395/712, 200.5, 395/200.51, 200.52, 651, 652, 653; 340/311.1, 825.44; 717/168–178; 709/216, 217, 218, 219, 220, 221, 222, 273

(56) References Cited

U.S. PATENT DOCUMENTS

| | | | |
|---|---|---|---|
| 3,818,453 A | 6/1974 | Schmidt et al. | 340/172.5 |
| 4,630,108 A | 12/1986 | Gomersall | 358/84 |
| 4,962,522 A * | 10/1990 | Marian | 340/311.1 |
| 4,972,504 A | 11/1990 | Daniel, Jr. et al. | 455/2 |
| 4,985,895 A | 1/1991 | Pelkey | 371/37.7 |
| 5,008,814 A * | 4/1991 | Mathur | 395/200.51 |
| 5,029,232 A | 7/1991 | Nall | 455/2 |
| 5,086,505 A * | 2/1992 | Goldberg et al. | 395/651 |
| 5,155,847 A * | 10/1992 | Kirouac et al. | 395/200.51 |
| 5,249,044 A | 9/1993 | Von Kohorn | 358/86 |
| 5,337,044 A * | 8/1994 | Folger et al. | 340/825.44 |
| 5,349,530 A | 9/1994 | Odagawa | 364/449 |
| 5,359,730 A * | 10/1994 | Marron | 395/712 |
| 5,381,138 A * | 1/1995 | Stair et al. | 340/825.44 |
| 5,544,036 A * | 8/1996 | Brown, Jr. et al. | 340/311.1 |
| 5,608,655 A * | 3/1997 | Moughanni et al. | 340/311.1 |
| 5,673,032 A * | 9/1997 | Ono | 340/825.44 |
| 5,699,275 A * | 12/1997 | Beasley et al. | 395/200.51 |
| 5,754,785 A * | 5/1998 | Lysik et al. | 395/200.52 |

* cited by examiner

*Primary Examiner*—Kakali Chaki
(74) *Attorney, Agent, or Firm*—Greg Welte

(57) ABSTRACT

Microprocessor-controlled equipment, such as cash register/inventory control systems, sometimes require in-field modification of programs which run on the microprocessors. Under the invention, such modified programs are downloaded to the equipment, via a commercially available paging service, through a satellite link. When owners of the equipment receive the new programs, they update old programs, as appropriate.

2 Claims, 3 Drawing Sheets

SATELLITE CONTROL OF ELECTRONIC MEMORY DEVICES

The invention concerns downloading computer programs, or data, to a microprocessor-controlled device, via a satellite link.

BACKGROUND OF THE INVENTION

Many commercial electronic systems are controlled by a microprocessor which runs programs which are stored in non-volatile memory. One example is found in inventory control systems, which communicate with cash registers in a retail establishment.

Sometimes it is desired to change a program which runs on the microprocessor, as when a bug has been found or a new version becomes available. This change in program often requires physical removal of the individual integrated circuits in which the program is stored, and replacement by other integrated circuits which contain the new program.

Such removal-and-replacement disrupts the parties who rely on the systems for their business operations: the systems are rendered inoperative during the removal-and-replacement. In addition, the removal-and-replacement, in general, should be performed by trained technicians, who are not inexpensive to hire.

OBJECTS OF THE INVENTION

An object of the invention is to provide an improved approach to modifying programs and data contained in microprocessor-controlled equipment.

SUMMARY OF THE INVENTION

In one form of the invention, a paging service broadcasts machine code to selected pagers, which store the code, and make it available to nearby microprocessors.

DETAILED DESCRIPTION OF THE INVENTION

This discussion will first consider an embodiment of the invention which is implemented using existing, commercially available, equipment.

Figure 1:
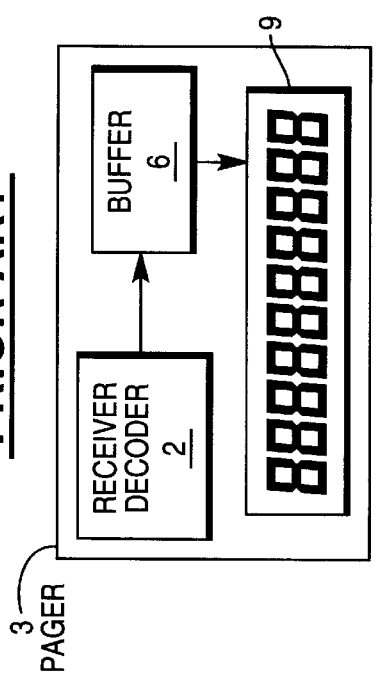
FIG. 1 illustrates a prior-art pager.

FIG. 1 illustrates a commercially available pager 3, such as that available from Motorola Corporation, Schaumburg, Ill. Such pagers, in general, perform two functions: a notification function and a data transfer function. As to the notification function, the pager 3 receives a signal from an artificial earth satellite (not shown). A receiver/decoder stage 2 detects the signal, which triggers a transducer (not shown) on the pager to produce a beeping sound, or a palpable thumping.

As to the data transfer function, the receiver/decoder 2 can also receive data, and store it within a buffer 6. The data is visibly displayed, as on a liquid crystal display 9. Typically, such buffers are limited in size to a few dozen, or a few hundred, bytes, because the pager is designed to display a small amount of data, such as a name or telephone number, or both.

Figure 2:
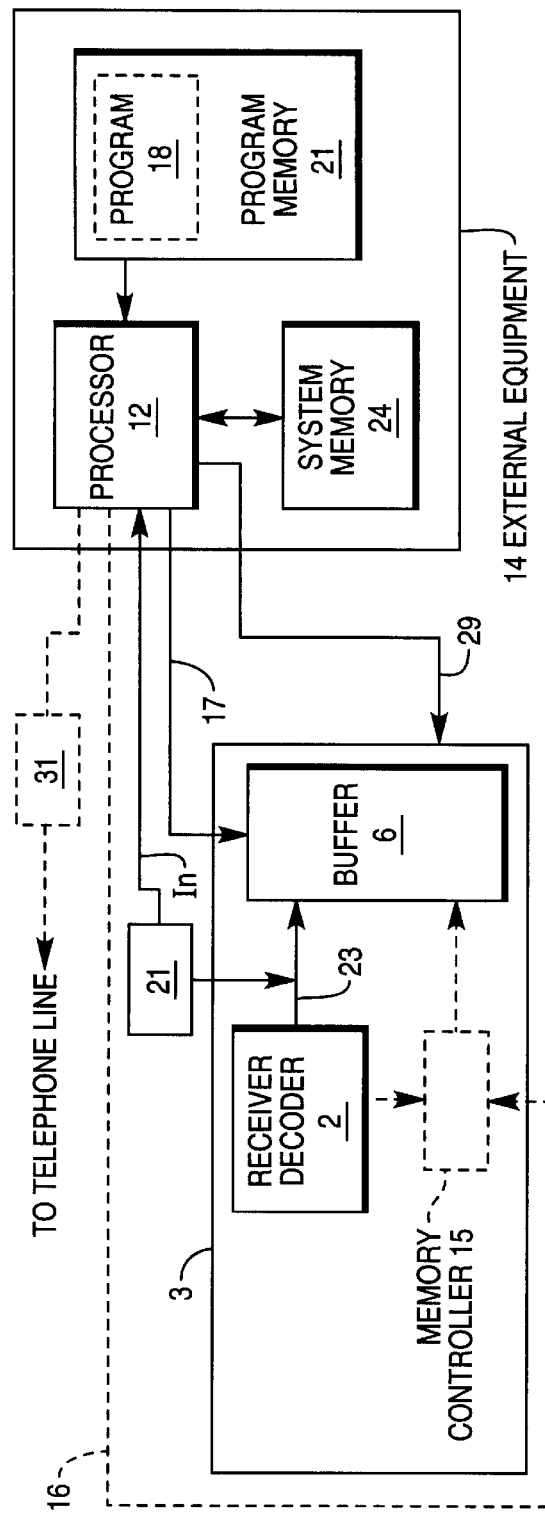
FIG. 2 illustrates one form of the invention.

FIG. 2 illustrates one form of the invention, and shows part of a pager 3. The buffer 6 within the pager has been enlarged to a suitable size to hold the data required by the invention. The buffer is also made accessible to a microprocessor 12, which controls external equipment 14. This external equipment can take the form of the inventory control system, discussed in the Background of the Invention.

How the microprocessor is given access to the buffer 6 will depend, of course, on the architecture of the pager. If the buffer 6 is controlled by a memory controller 15, then the microprocessor 12 can be given access to the memory controller 15, as indicated by dashed line 16. Alternately, the microprocessor, as indicated by line 17, can be given direct access to the buffer 6, by allowing the microprocessor to gain access to the control lines and busses (neither is shown) of the buffer 6.

In ordinary operation of the invention, the buffer 6 will remain dormant. In operation, the microprocessor 12 runs a program 18 contained in a program memory 21, in the usual manner, and may also utilize system memory 24. However, when the program 18 is to be changed, the buffer 6 comes into operation.

A party in possession of the new program delivers the new program, in digitized form, to a service (not shown) which communicates with the pager 3. Such services are commercially available, and will be termed "paging services" herein. One such service is GTE Telecom Marketing Corporation. In general, it is expected that the delivery of the data to the paging service will be accomplished by a common-carrier public-telephone link, using a modem.

The paging service signals the pager 3 of FIG. 2, and transmits the new program data, which the pager stores within its buffer 6. After the program data has been transmitted, the paging service transmits an end-of-data marker, which is stored in the buffer 6, at the end of the program data. A detector 21, designed to detect the end-of-data marker, detects the presence of the end-of-data marker on bus 23, as the marker is being written to the buffer 6, and issues a signal to microprocessor 12, as by pulling an interrupt line In.

When the microprocessor 12 is notified of the end-of-data marker, by interrupt In, the microprocessor takes several actions. One is to back-up the old program 18, as by writing it to a section of system memory 24. This backing-up is done to protect against the event that the new program is defective, in which case the old program will be re-used.

The second action is to temporarily disable the pager 3 from accepting new data, which would corrupt the program data just received, and now contained within the buffer 6.

The third is to copy the new program, now contained within the buffer 6, into program memory 21, to replace existing program 18. In this copying, a precaution must be taken not to contaminate the new program with the old program. For example, assume the old program is 500 bytes long, and the new program is shorter, at 400 bytes. Merely over-writing the old program with the new program will be ineffective, because, after byte number 400, the last 100 bytes of the old program still remain in program memory 21. One solution is to over-write the new program over the old program, and then look for the end-of-file marker of the new program. When it is found, it is erased, together with all data subsequent to it.

The fourth step is to terminate disablement of the pager 3.

After execution of these steps, the old program has been replaced, without human intervention, with the possible exception that initialization of the replacement, which occurs at the paging service, may have required human intervention.

Security Issues

One problem to be confronted is the existence of hackers, who may, without authorization, actuate the pager 3, and load it with nonsense data, or worse. To combat hackers, several measures can be taken.

One measure is to rely on the paging service to provide security. The data sent by present-day paging services is quite secure, for several reasons. One is that the original digital data, transmitted by the paging service, does not generally correspond directly with the digital data representing the program to be transmitted.

For example, each "0" in the program may be transmitted as a sequence of characters, such as "101011." Similarly, each "1" in the program may be transmitted as a different sequence, such as "100100." The data may also be pre-encoded for error-correction, and the encoding may be done by keys which periodically change. Thus, for a hacker to load unauthorized data into buffer 6 in FIG. 2, the hacker must know how to format and encode the unauthorized data in a manner which the receiver/decoder 2 will recognize. Such formatting and encoding is not considered simple.

Further, this data (which is multiply encoded as described above) is transmitted in the radio-frequency domain, using a methodology which is quite complex, such as Binary Phase Shift Keying (BPSK) or Gaussian Minimal Shift Keying (GMSK). The data may be further split into two quadrature channels, termed I and Q channels. Imitating such a methodology, to break into a pager, requires significant expertise.

Further still, as mentioned above, each pager is assigned a name. A 16-bit name allows approximately 64,000 possible names from which the hacker must choose, in trying to attack a given pager. Because of the large number of possible names, merely identifying the name of the pager to be attacked is a significant obstacle.

In addition, pager messages are believed to be preceded by special strings of data, termed "headers," which contain the pager's name, and other information. The receiver/decoder 2 in FIG. 2 only responds when the proper header is received.

Consequently, significant deterrents stand before a hacker who wishes to generate a non-authorized signal which the pager 3 will recognize and accept. Thus, in one form of the invention, an existing, commercially available paging service is used to transmit the programs, perhaps together with programming the pager to accept data only at a specified time every day. This programming can be handled by the microprocessor, which actuates a line 29, which activates the pager 3, at the specified times.

A second measure is based on the recognition that the signals reaching the pager 3 are relayed by an artificial earth satellite. The uplink to the satellite (that is, the signal sent to the satellite by the paging service) is considered secure against all but the most sophisticated hackers. However, the downlink (that is, the signal sent by the satellite to the pager 3) is less secure.

Figure 3:
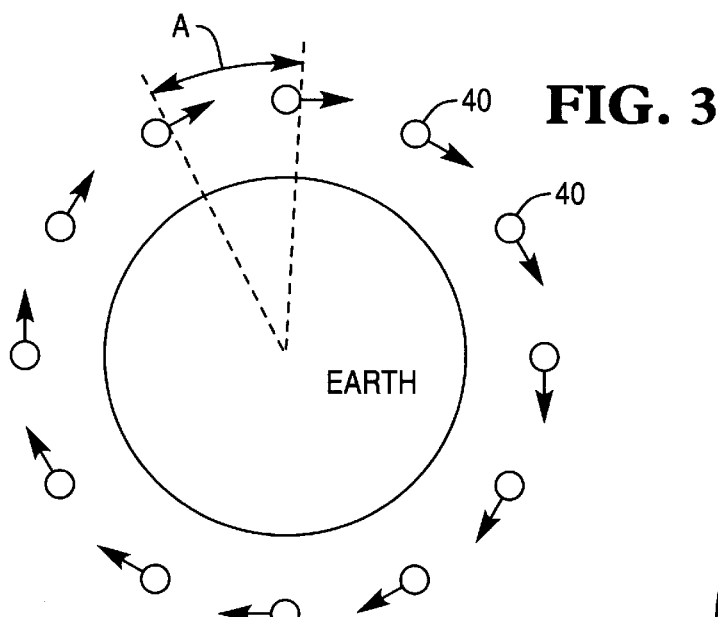
FIG. 3 illustrates 12 earth satellites.

But the source of the signals received by the pager can be localized to a region of the sky. That region is either (a) the location of the satellite, if the satellite is geo-stationary, or (b) a swath of sky, if multiple satellites are used. FIG. 3 illustrates the multiple-satellite case. If 12 satellites 40 are used, each 30 degrees apart, then a given antenna (not shown) is designed to cover the 30-degree arc A.

In either case, the antenna used by the pager 3 will be highly directional. Such an antenna would require that a hacker's antenna possess a lobe which physically coincides with one of the pager's antenna lobes. This requirement will, in all likelihood, place the hacker in physical proximity of the pager's antenna, and thus subject to detection, which is considered a deterrent to hacking.

A third measure is to provide each pager with a unique name, longer than the 16-bit name mentioned above. The pager 3 is designed to accept data only when the proper name precedes the data. As an example, if each name is 99 bits long, then $6.34 \times 10^{29}$ different names are possible. If a hacker, in attacking the pager 3, attempts one million names per second, then $6.34 \times 10^{23}$ seconds will be required, corresponding to $2 \times 10^{16}$ years, which exceeds the estimated age of the universe.

A fourth measure, also mentioned above, is to assign a time-of-day to each pager 3. The pager only "listens" for its name during a brief window, centered at the assigned time-of-day. If no name is received, then the pager blocks receipt of all data until the next window arrives. If the proper name is received, the pager accepts the data which follows.

A fifth measure is a variant of the fourth measure. The paging service transmits an encrypted message to the pager, specifying a future time at which the program will be transmitted. The pager refuses all messages until that time arrives.

A sixth measure is to coordinate the pager's satellite data link with another, closed link. For example, the system can be equipped with a telephone modem 31, as shown in FIG. 2. When a new program is to be transmitted to the buffer 6, the paging service first makes a telephone call to the microprocessor 12, through the modem 31. If the call delivers the proper password to the system, the pager 3 becomes activated. Then, the paging service transmits the pager's name, followed by the new program, via satellite link.

Of course, as long as a telephone link exists, it may be thought that the new program can be transmitted using that link. However, the data rate allowed by a telephone channel is severely restricted, compared with that allowed by a satellite link. As a rough approximation, assume each cycle of a sine wave is capable of carrying one bit of information. The bandwidth of a common telephone channel is about 3500 Hz, meaning that the highest frequency available is 3500 Hz, corresponding to 3500 bits/second, using this approximation.

In contrast, artificial satellites can use frequencies in the GigaHertz range, corresponding to a frequency of $10^9$ Hz, and higher. Plainly, the satellite link can transmit data roughly one million times faster than the telephone link (under this one-bit-per-sine-wave approximation). For long programs, this faster transmission can be significant, meaning that transmission by telephone is not desired.

Another issue regarding security is that the paging service is allowed to transmit material, such as programs, but the paging service, in general, is denied authority to run programs on the recipient devices. Only the owners of the devices are allowed to run programs which are transmitted by the paging services. Of course, the owners can grant limited, or greater, authority to the paging services to run programs, if desired.

Other Embodiments

Figure 4:
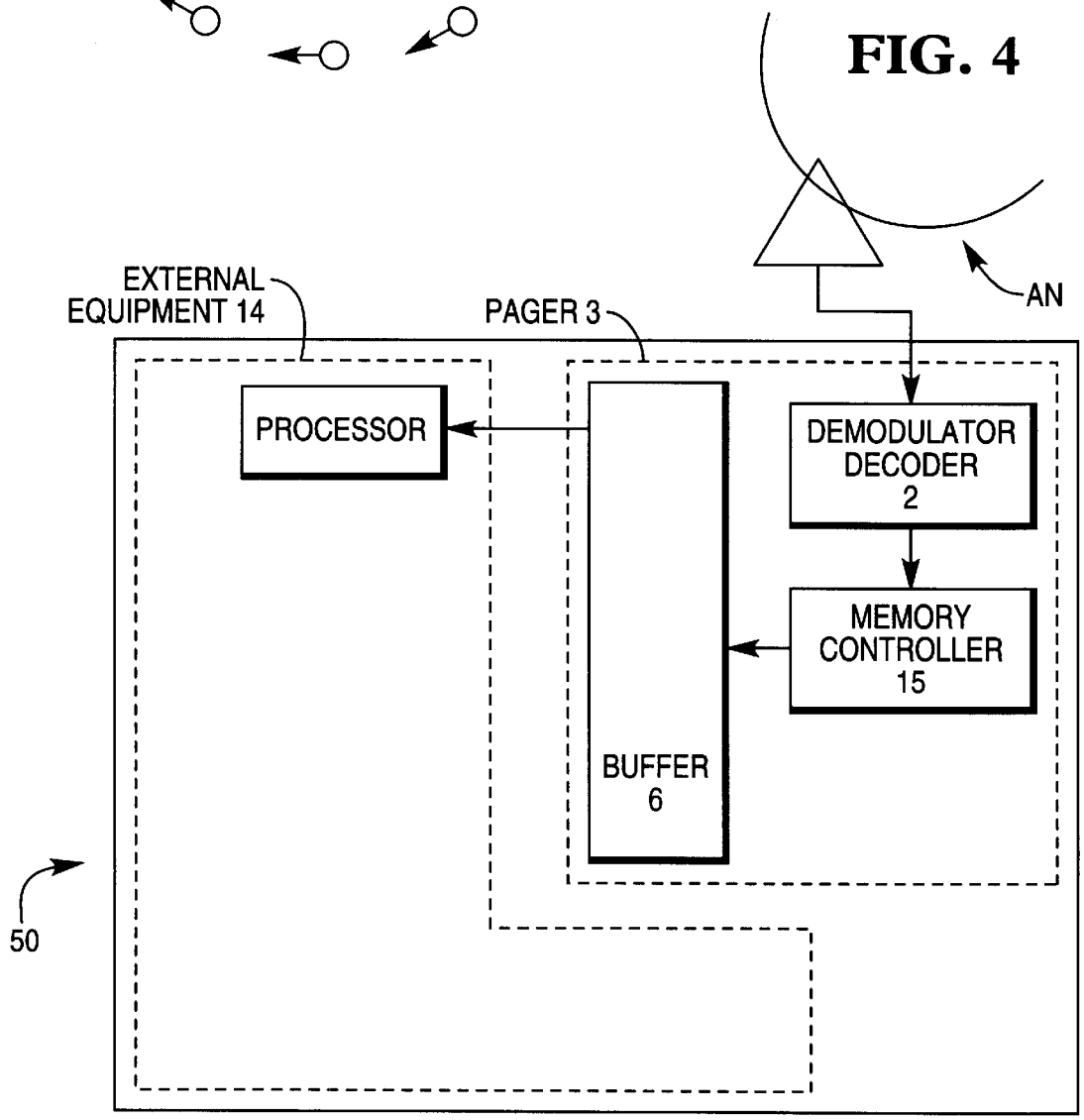
FIG. 4 illustrates part of the equipment of FIG. 2.
Figure 5:
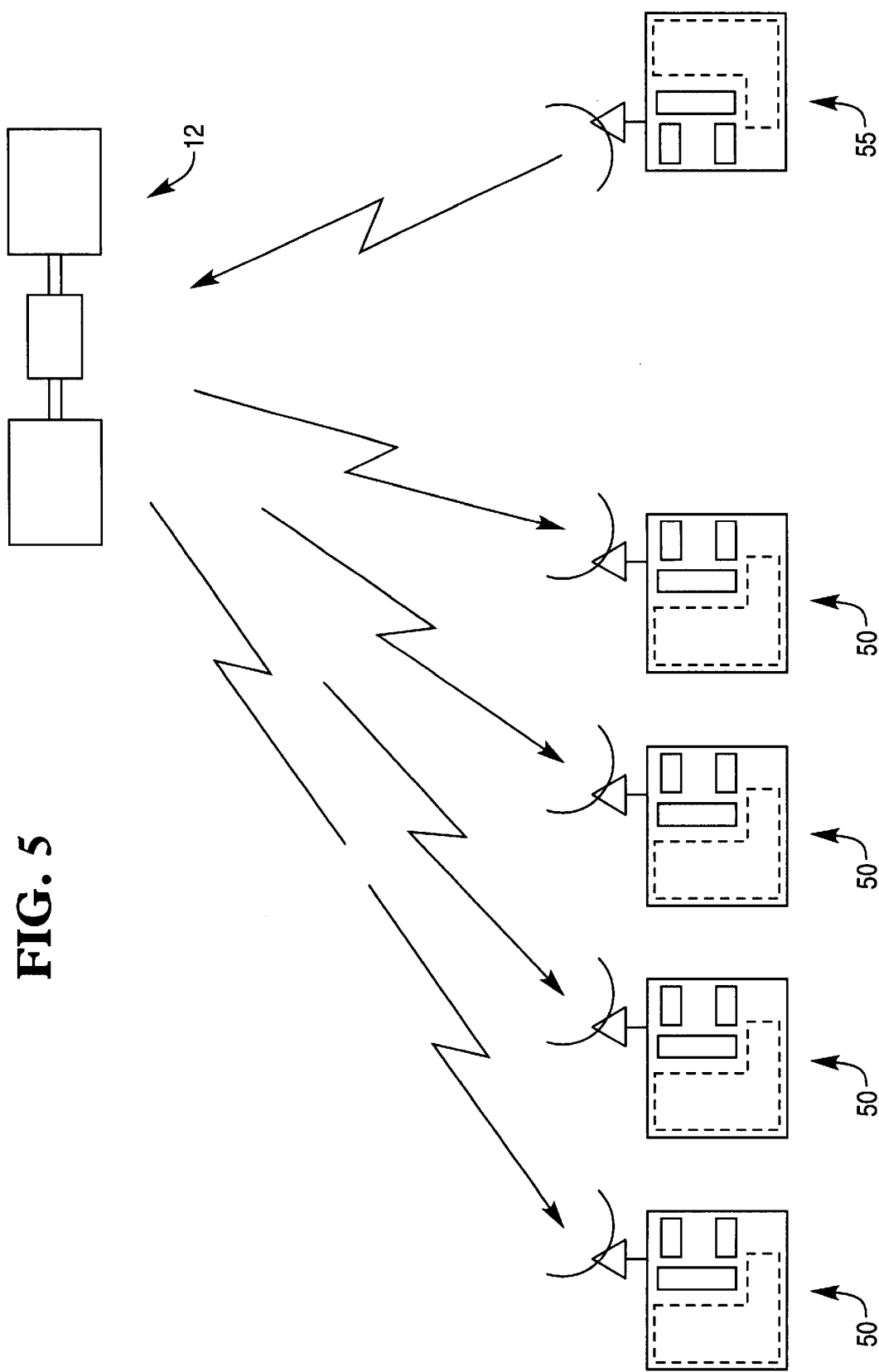
FIG. 5 illustrates a system embodying the units 50 of FIG. 4.

FIG. 4 is a re-arranged view of part of the equipment of FIG. 2, labeled as 50, together with an antenna AN. FIG. 5 shows four of these units 50, which receive signals from a satellite 40, which signals are broadcast by a paging service 55. A significant feature of the system is that the signals are broadcast in "parallel" to all units 50, but only the units 50 for which the signals are intended accept the signals. Further, the signals can be intercepted by any person or device within the signal path.

In another approach, some, or all, of the pagers are given the same names. Thus, these pagers can be addressed simultaneously by the paging service. Data, or programs, can be downloaded into these pagers in "parallel."

Additional Considerations

1. Archiving the old program was discussed above. However, the archiving is only needed for the a short time, during which a determination is made as to whether the new program is functioning properly. If the new program is not functioning properly, the old program is re-loaded into program memory, and is used as before, until a correct new program is obtained. On the other hand, when the new program is found to be functioning properly, the archived old program is discarded. (Of course, situations may exist when permanent archiving of the old program is desired, and the old program is retained.)

In the situations where the old program will be either re-loaded into program memory, or discarded, there is no need for a permanent, dedicated memory region to archive the old program. Instead, the buffer 6 of pager 3 can be used to archive the old program. That is, for example, when the data in address 1 of the buffer is loaded into address 1 of program memory, the latter data is placed into address 1 of the buffer. This procedure is repeated for all data. In effect, the data in program memory and the buffer are swapped. At the end of the swapping, the old program will reside in buffer 6, and the new program will reside in program memory 21.

2. Replacement of a program was discussed above. However, the invention can load data generally into buffer 6 of FIG. 2, rather than programs, and the data will be transferred to the proper location by processor 12.

3. In many cases, the program code 18 will take the form of machine code. That is, the code 18 is a sequence of binary numbers, which include machine-language instructions and data. Restated, the code 18 will be "executable" by the processor 12. The transmitted code 18 preferably does not take the form of non-executable code, such as source code.

4. A microprocessor generally executes the instruction which is located in memory at an address which is contained within the microprocessor's program counter. Then, the program counter is incremented, so that it points to the address of the next instruction. Many microprocessor-controlled systems are designed to that, upon initialization, a predetermined address is loaded into the program counter, causing the program beginning at that address to be executed.

In FIG. 2, that predetermined address would be the first address of program 18. Thus, the microprocessor's program counter can be said to "default" to that predetermined address.

Sometimes, systems are designed with a predetermined section of memory dedicated to programs for the microprocessor. Designers of software for the system are warned not to place anything, other than program material, into this memory space. This memory space is commonly termed "program memory."

From another point of view, "program memory" is the section of memory addressed by the incrementing program counter of the microprocessor. However, "program memory" does not start at the default address and extend to infinity. For example, the program itself contains a "Stop" or "End" instruction, beyond which the program counter does not pass.

5. The term "paging service" refers to a service which transmits signals at radio-frequency, or higher, to a satellite, which then relays the signals to earth. These signals are received by multiple pagers. Since the signals contain an address (or name) of a specific pager, or pagers, only the addressed pagers respond to the signal, and accept data contained within the signal.

Also, a "paging service" is not expected to be operated by a user of the invention. The user will provide programs to be distributed to the paging service, which will distribute the programs to the units 50 in FIG. 5.

6. It is possible to implement the invention using a cellular telephone modem, rather than a pager. However, the inherent security of a paging network is not available in cellular telephones. For example, telephone numbers are generally ten digits in length, corresponding to just under ten billion possible numbers. Thus, identifying the telephone number of a device to be attacked is not difficult.

Further, it is known that ham radio enthusiasts can listen to cellular traffic, by tuning to the proper frequency band. Since the cellular traffic is easy to detect, it is easy to simulate.

Further still, the data rates possible in present-day cellular modems are comparable to ordinary telephone data rates.

Nevertheless, it is possible to add sufficient encryption-and-security equipment to a cellular modem system, to deliver the program to program memory 21.

7. It is preferable that the pager-receiver be always operative, so that it always "listens" for new material. To this end, the pager-receiver should be equipped with a battery back-up, to accommodate power failures.

8. In one form of the invention, recipients acknowledge receipt of new material, so that the transmitter receives confirmation of the receipt. If the transmitter fails to receive confirmation, the transmitter takes appropriate action, such as (1) repeating the transmission, (2) sending a message to the receivers, as by electronic mail or normal postal service, informing the receiver of the failed transmission, or (3) sending magnetic copy of the transmitted material to the recipient, as by mailing a floppy diskette.

The detection of receipt of the material by the receiver and transmission of acknowledgment can occur in numerous different ways. As one example, when new material is transmitted to a recipient, the transmitter, by pre-arrangement, loads a specific code into a specific location in the receiver. This code can take the form of setting an interrupt, loading a specific data word into a specific memory location, creating a file on a disk having a specific name, and so on.

The recipient periodically looks for the code, as by executing a small computer program. When the code is found, the recipient erases the code, and transmits a message to the sender, which identifies the code. This transmission can take the form of electronic mail, a message sent through another pager, a FAX transmission, and so on.

Since the sender knows the identities of all intended recipients, the sender can match the acknowledgments with the list of intended recipients. When confirmation is found to be lacking from some intended recipients, appropriate corrective action is taken, as described above.

Numerous substitutions and modifications can be undertaken without departing from the true spirit and scope of the invention. What is desired to be secured by Letters Patent is the invention as defined in the following claims.

What is claimed is:

1. A method of modifying a previous program contained in microprocessor-controlled equipment, comprising the following steps:
    a) storing said previous program in a manner which allows it to be re-used at a later time in said equipment;
    b) using a paging service, transmitting a new version of said program, together with a code identifying said equipment;
    c) receiving said new version at said equipment;
    d) loading said new version into program memory of said microprocessor;
    e) preventing said paging service from causing said new version to run on said microprocessor; and
    f) transmitting a message, prior to transmission of said new program, which specifies the time when said new program will be transmitted.

2. A system for modifying a previous program contained in microprocessor-controlled equipment, comprising the following steps:
    a) means for storing said previous program in a manner which allows it to be re-used at a later time in said equipment;
    b) means for transmitting a new version of said program through a paging service, together with a code identifying said equipment;
    c) means for receiving said new version at said equipment;
    d) means for loading said new version into program memory of said microprocessor;
    e) means for preventing said paging service from causing said new version to run on said microprocessor; and
    f) means for transmitting a message, prior to transmission of said new program, which specifies the time when said new program will be transmitted.

* * * * *